United States Patent [19]
Fuller

[11] 3,943,773
[45] Mar. 16, 1976

[54] SENSING DEVICE AND METHOD
[75] Inventor: David L. Fuller, Atlanta, Ga.
[73] Assignee: David L. Fuller, Atlanta, Ga.
[22] Filed: Feb. 1, 1974
[21] Appl. No.: 438,636

[52] U.S. Cl. .............................. 73/432 A; 116/129 C
[51] Int. Cl.² ......................................... G09F 9/00
[58] Field of Search............ 73/432 A, 362.1, 363.7; 116/129 C

[56] References Cited
UNITED STATES PATENTS
763,829  6/1904  Wynne .............................. 73/432 A
2,065,365  12/1936  Doyle et al. ....................... 73/432 A FOREIGN PATENTS OR APPLICATIONS
929,626  6/1963  United Kingdom ............... 73/432 A
1,076,623  10/1954  France .............................. 73/432 A Primary Examiner—James J. Gill
Assistant Examiner—Anthony V. Ciarlante
Attorney, Agent, or Firm—B. J. Powell

[57] ABSTRACT

A sensing device with a sensing coil that moves an indicator member about an axis in response to changes in predetermined conditions and an optically reflective member associated with the indicator member on the coil to generate a virtual image of the indicator member in a reading plane. The application also encompasses the method of operation.

5 Claims, 7 Drawing Figures

SENSING DEVICE AND METHOD

BACKGROUND OF THE INVENTION

Numerous devices are on the market today to sense various conditions such as humidity and temperature. One of the more common forms of these sensing devices uses a coil of a spirally wound laminated sensing member in which one layer of the laminate is relatively insensitive to changes in the condition being sensed while another layer is sensitive to the condition being sensed. This sensitive layer changes in dimension in response to changes in the sensed condition. This causes the coil to move in a predictable manner in response to changes in the sensed condition. Thus, by fixing one end of the member and connecting the other end of the member to an appropriate mechanism, the movement of the coil can be used to drive a pointer and thus quantify the movement.

Most devices of this type provide a means to connect the circular movement of the coil to a pointer rotatable about the axis of the coil. The pointer then operates in a reading plane normal to the axis of the coil. One problem with such construction is that the interconnection between the coil and pointer is costly to produce and calibrate. This has resulted in the devices being manually assembled thereby subjecting the coil to contamination and damage. Further, the power to drive the pointer was difficult to obtain from the coil thereby reducing its accuracy and response time.

SUMMARY OF THE INVENTION

These and other problems and disadvantages associated with the prior art are overcome by the invention disclosed herein by providing a sensing device which is simple in construction, inexpensive to manufacture, and accurate in operation. The quantified reading is optically displayed in the reading plane of the device normal to the axis of the sensing coil without the requirement of any mechanical connections between a pointer and the sensing coil. No power from the coil is required to generate the indicated reading in the reading plane.

The apparatus of the invention includes a support, a sensing coil comprising a spirally wound sensing element carried by the support and having an indicator attached to the outer sensing surface defined by the member, and an optical means defining at least one optical surface which has an arc thereon concentric with the axis of the coil for creating a virtual image of the indicator in a reading plane substantially normal to the axis of the coil. Thus, there is no mechanical connection between the coil and the indicating image generated in the reading plane.

The method of the invention includes placing a member which is moved along a sensing surface defined by the member in response to changes in the certain predetermined conditions and which has an indicating means thereon moved along the sensing surface as the member is moved and optically generating a virtual image of the indicator means in a viewing plane displaced from said sensing surface.

These and other features and advantages of the invention disclosed herein will become more fully understood upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
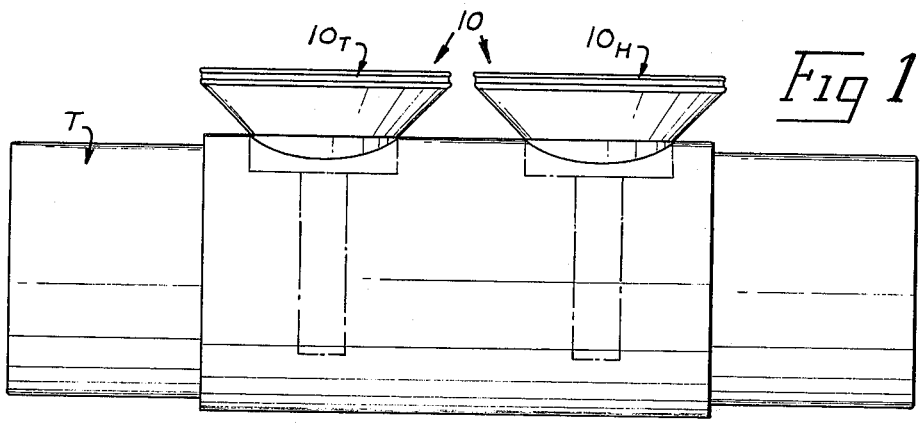
FIG. 1 is a side view of two embodiments of the invention ready for use.
Figure 2:
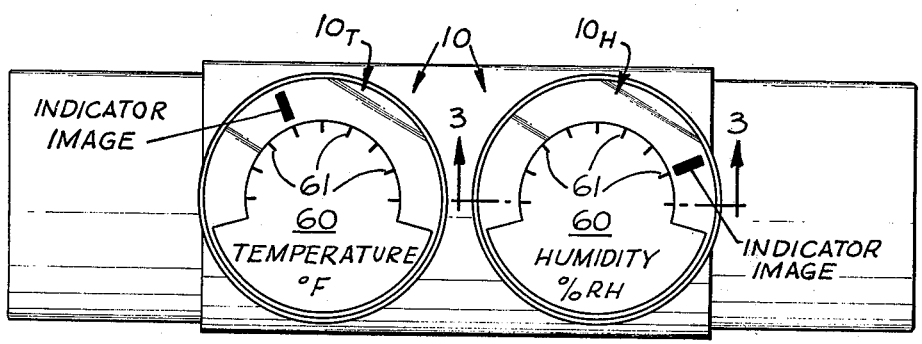
FIG. 2 is a face view of the invention of FIG. 1.

Referring to FIGS. 1 and 2, it will be seen that the sensing device 10 is illustrated as a hygrometer $10_H$ and a thermometer $10_T$ mounted in a piece of tubing T to sense the temperature and humidity of the fluid medium passing through tubing T. Because the construction is the same for both versions of the sensing device 10 except for the specific material used in the sensing element, only the sensing device $10_H$ will be described in detail with the same reference numbers applied to the sensing device $10_T$.

Figure 4:
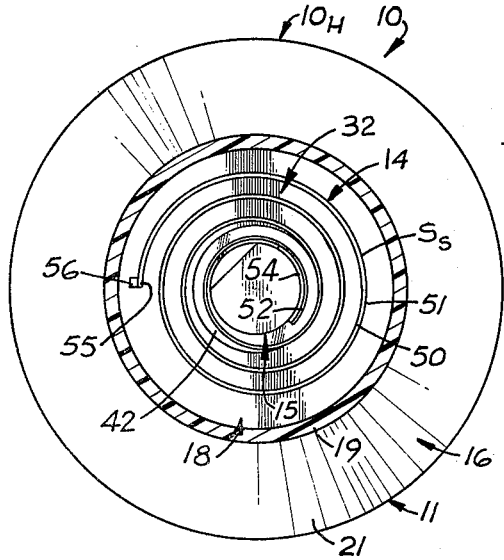
FIG. 4 is a cross-sectional view of the invention taken along line 4—4 in FIG. 3.
Figure 3:
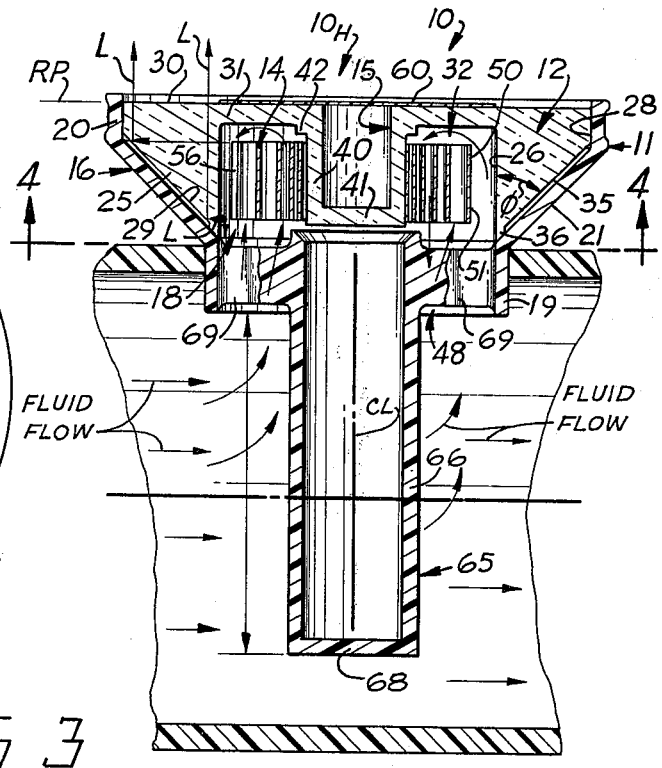
FIG. 3 is an enlarged longitudinal cross-sectional view taken along line 3—3 in FIG. 2.

As more specifically seen in FIGS. 3 and 4, the sensing device 10 includes generally a housing 11, a lens 12, a sensing member 14 and a support 15. The housing 11 is a tubular member having a side wall 16 defining a central passage 18 therethrough and having a centerline CL. The inner end of side wall 16 has an annular mounting flange 19 formed therein through which the passage 18 opens. The outer end of side wall 16 has an annular lens flange 20 formed therein through which the opposite end of passage 18 opens. An angled section 21 connects flanges 19 and 20 so that flanges 19 and 20 and section 21 are all concentric about centerline CL.

The lens 12 is carried in housing 11 and retained therein by the lens flange 20. The lens 12 is made of an optically transmitting material and includes an annular body 25 defining an inside cylindrical surface 26 concentrically about the centerline CL, an outside cylindrical surface 28, an optical surface 29 connecting the inside and outside surfaces 26 and 28, and a top surface 30. A support disk 31 integral with the inside top portion of body 25 closes the upper end of the opening in body 25 to form a sampling chamber 32. The surfaces 26, 28 and 29 are concentric while the top surface 30 is normal to surfaces 26 and 28. The optical surface 29 defines an included angle $\phi$ with the inside surface 26 thus making optical surface 29 conical. Thus, it will be seen that the lens 12 is an annular prismatic lens. When the angle $\phi$ is approximately 45° and the material of the lens has a refractive index of at least 1.50 (one such material is polystyrene), the light received at the inside surface 26 approximately normal thereto will be totally reflected onto the top surface 30 making the lens 12 totally reflective internally provided an air space 35 is left between lens surface 29 and section 21. A lip 36 is formed around the bottom of surface 29 to hold lens 12 so that the air space 35 is left as seen in FIG. 3.

When the lens 12 is positioned in housing 11, the lens flange 20 frictionally engages the outer cylindrical surface 28 to retain lens 12 in position in housing 11. This positions the surfaces 26 and 29 concentrically with respect to the centerline CL so that surface 28 defines the included angle $\phi$ with respect to centerline CL. The top surface 30 is normal to centerline CL to define the reading plane RP.

The support 15 is mounted centrally on disk 31 so that it is concentric with centerline CL and projects into chamber 32. The support 15 is a cylindrical hollow post with an annular side wall 40 closed at one end by end wall 41. An abuttment 42 is provided around the side wall 40 on the back side of the disk 31 to position the sensing member 14 as will become more apparent.

The sensing member 14 has a similar configuration for both the hygrometer $10_H$ and thermometer $10_T$ although the material of the member 14 is different for each. The member 14 is a coil formed by a condition responsive laminate 50 arranged in a spiral configuration. The laminate 50 has a base layer that is relatively insensitive to changes in the condition being sensed while another layer in the laminate is sensitive to changes in the condition being sensed. This causes the laminate to deflect as the condition sensitive layer expands and contracts in such a way that the coil moves as is known in the art. The coil 14 for use in hygrometer $10_H$ uses a hygroscopic material for the condition sensitive layer such as that described in U.S. Pat. No. 3,301,057. The coil 14 for use in thermometer $10_T$ uses a conventional bi-metal material which is known in the art.

The coil 14 is mounted on the support 15 within the sampling chamber 32 so that the centerline of coil 14 coincides with the centerline CL from which the spiral flight of laminate 50 emanates. The outside surface 51 of laminate 50 defines a sensing surface $S_s$ which is oriented substantially parallel to centerline CL. The inner end 52 of laminate 50 may be formed in a circular arrangement as seen in FIG. 4 to facilitate mounting the laminate onto the post 15. An appropriate adhesive 54 may be used to attach the inner end 52 to post 15 such as a double faced pressure sensitive adhesive. The outer free end 55 of laminate 50 has an indicator tab 56 attached to the outside surface 51 thereof facing the inside cylindrical surface 26 of lens 12. As the coil 14 moves, the indicator tab 56 is moved within the sensing surface $S_s$ in response to changes in the condition to be sensed. The abuttment 42 maintains the coil 14 spaced from disk 31 so that it is free to move in chamber 32.

As indicated by the light rays L in FIG. 4, it will be seen that lens 12 generates a virtual image of the tab 56 in the reading plane RP which can be viewed. This is because the light rays from tab 56 are reflected by the optical surface 29. Thus, the readout of the device 10 is transferred from the sensing surface $S_s$ to the reading plane RP optically rather than mechanically as has been done in the prior art. This results in the use of a coil 14 which is simple in construction so that it lends itself to mass production and has no power loss as is encountered in the prior art.

A label 60 is attached to the top surface 30 of lens 12 and is provided with appropriate indicia 61 to quantify the changes in the position of the tab 56 along the sensing surface $S_s$. The label 60 may be attached with a suitable adhesive.

A deflector 65 is carried by housing 11 and extends from the sampling chamber 32 out through the mounting flange 19 into tubing T a distance $d_1$. The deflector 65 is a hollow tubular member having an annular side wall 66 closed at its projecting end by end wall 68. The deflector 65 is mounted on flange 19 by circumferentially spaced spokes 69 so that it is concentric about centerline CL. The diameter of deflector 65 is considerably less than the inside diameter of flange 19 so that an open mouth 48 to chamber 32 is provided between spokes 69. This causes a vortex to be generated in the fluid medium passing through tubing T so that the fluid medium is circulated into the sampling chamber 32. This constantly supplies a fresh sample of the fluid medium to chamber 32 to provide constant monitoring. By selecting the length $d_1$ greater than the radius of tubing T, good representative samples of the fluid medium will be supplied to chamber 32.

Figure 5:
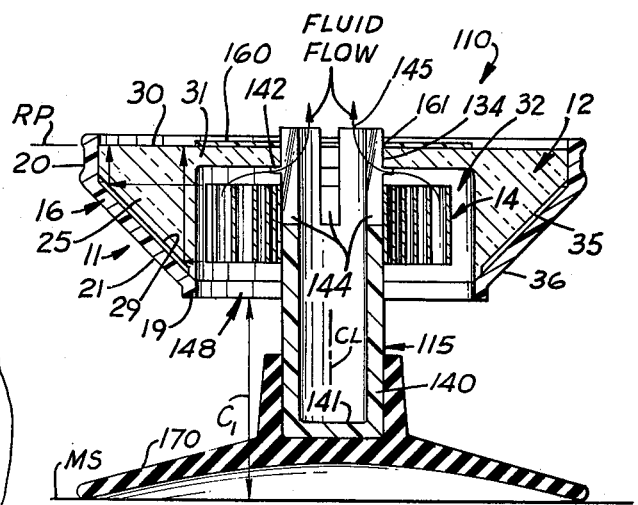
FIG. 5 is a view similar to FIG. 4 of an alternate embodiment of the invention.
Figure 6:
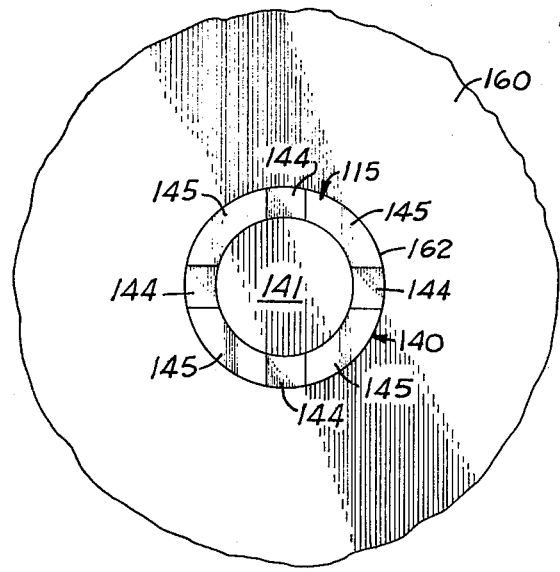
FIG. 6 is an enlarged partial face view of the embodiment of FIG. 5.

Referring to FIGS. 5 and 6, an alternate embodiment of the sensing device is illustrated and designated 110. Those components of the device 110 thats common to the device 10 have like reference numbers applied thereto. The device 110 is designed to sense conditions in the ambient atmosphere rather than flow in the tubing. The support member 115 has been modified from support member 15. Support member 115 is a cylindrical hollow post with an annular side wall 140 closed by end wall 141. The open end of post 115 is received through a hole 134 in the disk 31 of lens 12 and an abuttment 142 is provided around side wall 140 in the vicinity of the open end of the post which engages the back side of disk 31 so that the open end of post 115 projects beyond the top surface 30 of lens 12. Slots 144 extending through side wall 140 from the arcuate retaining tabs 145 therebetween to hold the post 115 in position in hole 34. The slots 144 also serve to connect the sampling chamber 32 with the open end of post 115. This allows air to flow into chamber 32 through mouth 148 between flange 19 and post 115 and out of chamber 32 through slots 144 and the open end of post 115 as seen in FIG. 5 to give good sampling quality.

An appropriate mounting member 170 is provided on the projecting end of post 115 such as the suction cup illustrated. This allows the device 110 to be mounted on a surface or a wall in a room in which the conditions are to be sensed. The length of the post 115 is such that sufficient clearance $c_1$ is provided between flange 19 and the mounting surface MS to insure good air flow through the device 110.

It will also be noted that the label 160 has a hole 162 therethrough over the hole 34 in lens 12 so that the open end of post 115 projects therethrough. This allows the air to circulate through post 115.

Figure 7:
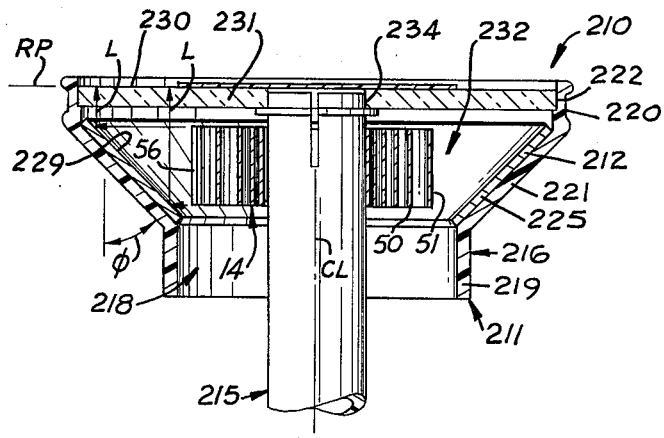
FIG. 7 is a view similar to FIG. 4 of another embodiment of the invention.

Another embodiment of the device is seen in FIG. 7 and designated 210. The device 210 operates in substantially the same manner as the device 10 and those portions common to device 10 have the same reference numbers. The sensing device 210 includes a housing 211 with tubular side wall 216 defining a central passage 218 therethrough about centerline CL. An annular mounting flange 219 is formed at one end of wall 216 and an annular holding flange 220 is formed at the opposite end of wall 216 connected by an angled section 221 defining the angle $\phi$ with centerline CL.

An optically reflective member 212 is mounted on the section 221 which has an annular body 225 defining an angled optically reflective surface 229 also defining the angle $\phi$ with respect to centerline CL. The surface 229 serves the same function as surface 29 in lens 12. The member 212 is illustrated as a mirror.

A transparent support disk 231 is mounted in an appropriate recess 222 on the inside top edge of flange 220 closes the upper end of passage 218 to form a sampling chamber 232 in housing 211. A central hole 234 is provided through disk 231 to mount a support 215 which carries sensing member 14. Thus, it will be seen that the member 212 serves the same purpose as lens 12 to generate an optical image of the indicator tab 56 in the reading plane RP defined by the top surface 230 of disk 231 which is substantially normal to the centerline CL.

It will be understood by those skilled in the art that an endless variety of configurations could be applied to surfaces 26, 29 and 30 of lens 12 to create some special effect in the virtual image of indicator tab 56 generated in the reading plane RP. For example, the optical surface 29 shown as a conical surface could be made toric aspherical for the purpose of magnifying or reducing the apparent size of the indicator tab 56 in the optically generated virtual image. Likewise, the surface 30 could be aspherized for a similar result.

While specific embodiments of the invention have been disclosed herein, it is to be understood that full use may be made of modifications, substitutions and equivalents without departing from the scope of the invention.

I claim:

1. A sensing device for indicating changes in a certain predetermined condition such as temperature and humidity in a fluid medium comprising:

a fixed support post having a first central axis;

a sensing coil including a spiral wound sensing element having an inner end, an outer end, and a second central axis, said sensing element having a substantially constant width along its length, said sensing element defining an outside surface thereon of said substantially constant width along its length generally parallel to said central axis and said sensing element expanding and contracting in response to changes in the certain condition in the fluid medium to open and close said coil said inner end of said sensing element of said coil affixed to said post to support said coil so that said second central axis of said coil coincides with said first central axis of said support post so that said inner end of said sensing element is relatively fixed while the remainder of said sensing element moves as said sensing element expands and contracts;

an indicator affixed to said outside surface of said sensing element, said indicator having a width substantially equal to the width of said sensing element, said indicator lying within the confines of said outside surface of said sensing element at a prescribed position along the length of said outside surface so that said indicator moves with said sensing element as said sensing coil opens and closes;

an annular optically reflective member fixably carried by said support post concentrically about said first and second central axes outboard of said sensing coil, said optically reflective member defining an annular optically reflective surface thereon concentric about said first and second central axes, said reflective surface laterally aligned with said outside surface of said sensing element and with said indicator, said optically reflective surface defining a prescribed including angle with respect to said first and second central axes so that an optical image of said indicator is generated in a reading plane normal to said central axis; and, indicia means operatively associated with said optical image of said indicator in said reading plane to quantify the movement of said indicator on said sensing element of said coil.

2. The sensing device of claim 1 wherein said optically reflective member includes an annular internally reflective prismatic lens concentric about said first and second central axes; said lens defining a first annular inside surface concentric about said central axis and parallel thereto, a second annular surface concentric about said central axis and lying in a plane generally perpendicular to said central axis, said second annular surface defining said reading plane, and said optically reflective surface outboard of said first annular surface so that light received through said first surface will be reflected by said optically reflective surface to said second surface; and further including a support disk integral with the inside of said lens adjacent said second surface, said support disk fixedly carried by said post to fixedly support said lens so that said first surface is concentric about said first and second central axes and said sensing coil is laterally aligned with said first surface and lies between said support post and said first surface of said lens, said disk and said lens defining a sampling chamber in which said coil is located having a sampling opening thereto in communication with the fluid medium.

3. The sensing device of claim 2 wherein said indicator includes a tab attached to said outside surface of said sensing element at said outer end.

4. The sensing device of claim 3 further including a tubular housing mounting said lens therein, said housing extending around said lens adjacent said reflective surface and a closed air space defined between said optically reflective surface on said lens and said housing to cause only the optical image of said indicator and said outside surface of said sensing element to be seen in said reading plane.

5. The sensing device of claim 4 further including a piece of tubing defining a central passage therethrough having a centerline and through which the fluid medium to be sampled is passing, said tubing defining a hole therein mounting said housing so that said first and second central axes are oriented generally perpendicular to said centerline of said passage, said housing further including an annular flange extending through said hole in said tubing in sealing engagement with said tubing, said annular flange defining an inlet passage therethrough having a first prescribed diameter in communication with said sampling opening to said sampling chamber at one end and in communication with said passage through said tubing at the other end; and further including an elongate cylindrical deflector member having a second prescribed outside diameter smaller than said first diameter and having a deflector centerline, said deflector member carried by said housing so that the deflector centerline of said deflector member coincides with said first and second central axes and said deflector member extends through said inlet passage in said flange into said central passage through said tubing to generate a vortex in the fluid medium passing through said central passage in said tubing and cause some of the fluid medium to be circulated through the inlet passage and into the sampling chamber to place the fluid medium in communication with said sensing element.

* * * * *